United States Patent [19]
Kousek et al.

[11] 4,448,261
[45] May 15, 1984

[54] MOTORIZED HAND TOOL FOR DRILLING

[75] Inventors: Heinz Kousek, Muntlix, Austria; Ernst Wohlwend, Nendeln, Liechtenstein

[73] Assignee: Hilti Aktiengesellschaft, Schaan, Liechtenstein

[21] Appl. No.: 316,739

[22] Filed: Oct. 30, 1981

[30] Foreign Application Priority Data

Oct. 31, 1980 [DE] Fed. Rep. of Germany ....... 3041099

[51] Int. Cl.³ .............................................. B23Q 5/00
[52] U.S. Cl. ......................................... 173/12; 408/6
[58] Field of Search ............... 173/2, 12; 408/5, 6; 192/129 A; 81/467

[56] References Cited

U.S. PATENT DOCUMENTS

| | | | |
|---|---|---|---|
| 3,456,740 | 7/1969 | Paule et al. .......................... | 173/118 |
| 3,613,853 | 10/1971 | Linthicum ......................... | 173/12 X |
| 3,768,573 | 10/1973 | Jennings ............................ | 173/12 X |
| 4,063,600 | 12/1977 | Krzes ................................... | 173/12 |
| 4,090,802 | 5/1978 | Bilz ...................................... | 408/6 X |
| 4,307,784 | 12/1981 | Smith .................................. | 173/12 X |
| 4,316,512 | 2/1982 | Kibblewhite et al. ................ | 173/12 |

FOREIGN PATENT DOCUMENTS 589497 7/1977 Switzerland .

*Primary Examiner*—E. R. Kazenske
*Assistant Examiner*—Willmon Fridie, Jr.
*Attorney, Agent, or Firm*—Toren, McGeady and Stanger

[57] ABSTRACT

A manually guided motorized hand tool used for drilling and/or percussive drilling includes a housing with a mass movably mounted about the drilling axis for movement relative to the housing. A switch is mounted on the housing and is operable by the mass when it moves a certain angular distance relative to the housing. When operated, the switch cuts off the power supply to the hand tool.

7 Claims, 3 Drawing Figures

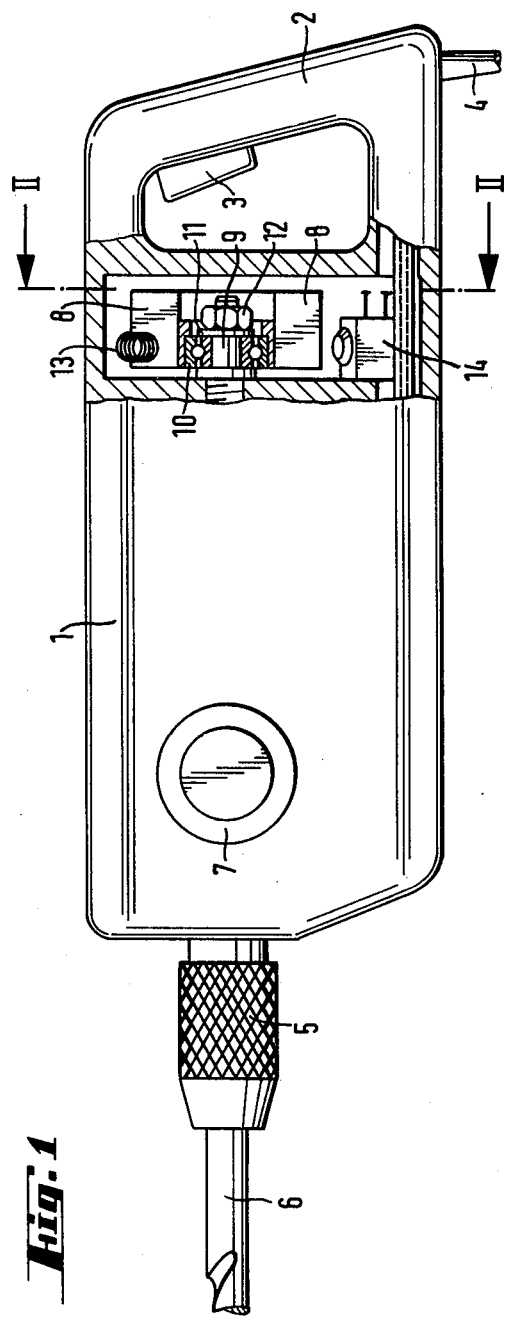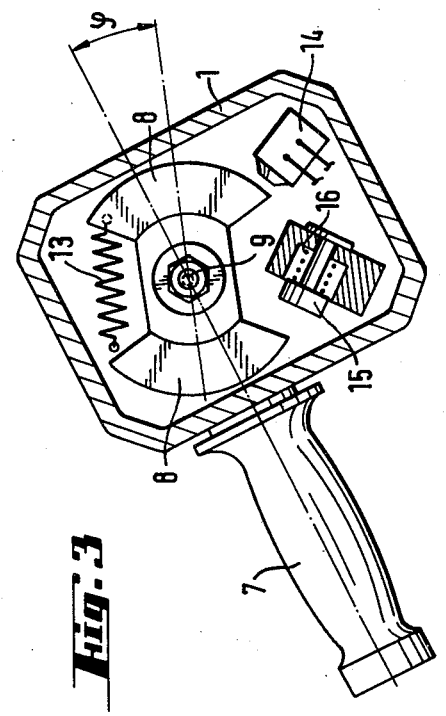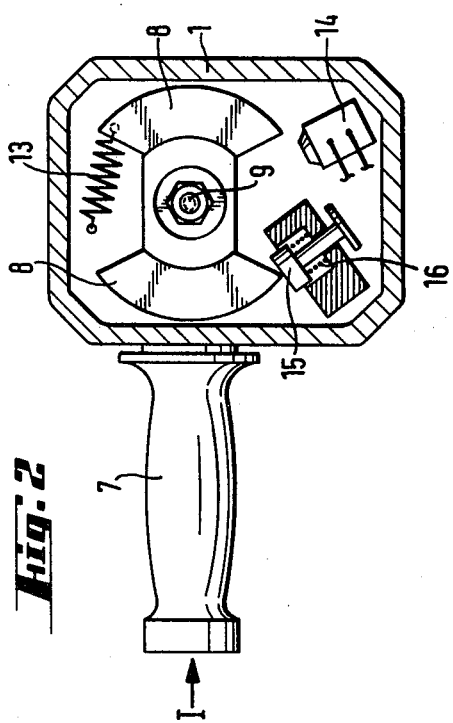

MOTORIZED HAND TOOL FOR DRILLING

SUMMARY OF THE INVENTION

The present invention is directed to a manually guided motorized hand tool for drilling and/or percussive drilling and includes a housing with a handle.

In manually guided hand tools used for drilling, the moment of reaction must be applied by the operator. This is easily accomplished during normal operation. When drilling takes place in a non-homogeneous material, however, the drill may suddenly jam or even become totally blocked. As a result the reaction moment rises rapidly and significantly and usually the operator is not generally prepared for such an occurrence. When this happens it is possible that the operator may be injured. Moreover, if the operator is working on a scaffold or ladder there is the danger of loss of balance which may result in a serious accident.

To limit the danger in such a situation, it has been known to locate a clutch between the driving motor and the drill shaft which clutch responds to a specific moment. The response of such a clutch, however, requires that the operator applies a corresponding counter-moment. When suddenly applying a high counter-moment, the operator may lose his balance and expose himself to the dangers mentioned above.

Furthermore, it is also known to arrange the handle so that it pivots against the force of a spring so that a specific deflection of the handle activates a switch which cuts off the power supply to the driving motor. Such a solution requires a corresponding counter-moment to trigger the switch. If the operator is not prepared for the possibility for such a moment, the tool may be torn out of his hands which could lead to the occurrence of injuries.

In still another known solution, the transition section between the housing and the handle includes regions which deform under extreme stress. The deformation of these regions is measured by wire strain gauges and the resulting signal is used to control the driving motor. In such a tool the counter-moment necessary to trigger the device must be applied by the operator. During a sudden increase in the counter-moment, the operator may lose his balance and suffer injuries.

Therefore, it is the primary object of the present invention to provide a manually guided motorized hand tool for drilling and/or percussive drilling which has a high operating safety factor.

In accordance with the present invention, a mass is installed in the tool housing so that it is movable relative to the housing in a plane extending substantially at right angles to the drilling shaft. A switch is arranged on the housing so that it is operated when the mass moves relative to the housing. When operated, the switch interrupts the power supply to the driving motor of the tool.

In the present invention, the inertia principles is used. To explain in a somewhat simple manner, the principle consists in that the housing rotates when a high moment of reaction occurs, while the mass, as a result of its inertia, remains in position. Accordingly, there is a relative angular displacement between the housing and the mass. When this relative displacement reaches a certain angular value, the switch is operated and the power supply to the driving motor is interrupted. In a hand tool operated electrically, this means the electric power supply is interrupted, and in a hand tool powered by an internal combustion engine, the fuel supply is cut off. Along with the switch, a clutch can be used for interrupting the flow of force and/or a brake can be provided to convert the energy in the rotating parts to heat. When a brake is used, it is possible to stop the rotating parts quickly within a permissible angle of torque of the housing.

The solution afforded by the present invention adapts automatically to the manner in which the operator handles the tool. If the operator holds the tool loosely, then a slight rise in the moment of reaction is sufficient to trigger the safety device. On the other hand, if an intentionally high counter-torque is applied, then higher moments are required before the safety device becomes operable. Further, there is the possibility that the operator could intentionally operate the switch by turning the tool around the drilling axis. If the operator is taken by surprise by a rapid increase in the torque, then the safety device responds automatically.

Basically there are two different possibilities for mounting the mass for movement relative to the housing. For safe operation, it is feasible to mount the mass for rotation about a shaft arranged parallel to the drilling shaft or axis. Such a mounting of the mass provides a rotary pendulum type of operation. The centroidal axis of the mass may coincide with the axis of rotation. Such an arrangement has the advantage that components of force, resulting from a non-circularly rotating tool, which occur at a right angle to the drilling shaft, do not result in any influence of the mass relative to the switch. In addition, no pitching moments of the mass can result due to axial accelerations of the tool. The axis of rotation of the mass may be the same as the axis of the drill shaft. If the centroidal axis of the mass coincides with the drilling shaft, then there is no acceleration of the mass when the housing rotates. Consequently, only minor forces occur at the mounting of the mass.

Besides mounting the mass about a shaft, it is also possible to mount it by means of spring elements. The mass, attached by a flat or leaf spring, can perform a pendulum motion. Such an arrangement results in a particularly simple, space-saving embodiment. Further, it is possible to provide a rectilinear motion of the mass when it is supported between spring elements. In both of these arrangements, the movement is described by the center of gravity of the mass during relative movement with respect to the housing and such movement must not pass through the drilling shaft.

To keep the mass which acts as the inertia body, small, the switching forces must also be kept low. Therefore, it is advantageous to construct the switch as a non-contact proximity switch. Such a switch requires no direct switching force. The operation of the switch occurs solely due to the proximity of the mass relative to the switch.

To prevent the repeated slight rotational movement of the housing from resulting in the operation of the switch, it is advantageous if the mass is moved against the restoring force of a spring in its predetermined relative angular displacement with respect to the housing which operates the switch. Such a spring determines the starting position of the mass relative to the housing and brings the mass back to that position after a relative angular displacement between the two parts. Consequently, the operability of the safety mechanism embodying the present invention is always guaranteed.

During operation of a hand tool, vibrations may develop because of periodic rotation of the housing. To prevent such vibrations from causing a resonant rise of the mass and a consequent undesired operation of the switch, it is advantageous if the mass can be moved, while overcoming the force of a holding element, into the predetermined angular displacement position relative to the housing which effects the operation of the switch. Such a holding element may be in the form of a stop element, such as a ball notch or the like.

To achieve a simple construction and safe operation, it is advantageous if the holding element is a magnet. A magnet has a certain restoring force so that an additional spring can be omitted under certain circumstances. To prevent low rotary oscillations of the mass, during the operation of the magnet, the magnet may be spring mounted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view, partly in section, of a hand tool embodying the present invention;

FIG. 2 is a sectional view taken along the line II—II in FIG. 1 with the tool in the inoperative position; and FIG. 3 is a sectional view similar to FIG. 2, however showing the housing rotated relative to the mass.

DETAIL DESCRIPTION OF THE INVENTION

In FIG. 1 a hand tool for drilling and/or percussive drilling is illustrated and includes an elongated housing 1 with a handle 2 connected to one end of the housing. Within the handle there is a trigger 3 and a feed line 4 forming a power supply to the tool. At the opposite end of the housing 1 from the handle 2, there is a drill chuck 5 in which a portion of a drilling tool 6 is shown. As can be seen best in FIGS. 2 and 3, a handle 7 extends laterally from the housing 1 adjacent the end mounting the drill chuck 5.

Mounted within the housing 1, adjacent its handle end, is a mass 8 illustrated in FIGS. 1, 2 and 3. The mass 8 is mounted so that it is rotatable relative to a shaft 9. Shaft 9 is an extension of the drilling shaft of the tool. A bearing 10 is provided between the shaft and the mass, to prevent friction. Bearing 10 is held on the shaft by a washer 11 and a nut 12. In the drawing a spring 13 is connected to the housing 1 and to the mass 8 for restoring the mass into a predetermined starting position relative to the housing. A switch 14 is mounted within the housing.

As can be seen in FIG. 2, in the section substantially normal to the drilling axis, the mass 8 has a substantially dumb-bell shaped configuration and is rotatable about the shaft 9. In FIGS. 2 and 3 a magnet 15 is shown which serves as a holding element. Magnet 15 is supported so that it is movable against the force of a compression spring 16 whereby it can perform small vibrations with the mass 8.

In FIG. 3 the housing is shown in a rotated position with respect to FIG. 2 and it may experience such a rotated position, as explained above, when the drilling tool jams, with or without the assistance of the operator. Mass 8 is rotatable relative to the housing and remains stationary due to its inertia when the housing is rotated. When such relative displacement occurs there is a relative angular displacement of the mass 8 through an angle $\theta$ with respect to the housing 1. Since the spring 13 is secured to the housing 1 it tends to provide a restoring force on the mass 8. After a certain relative displacement between the mass 8 and the housing 1, the magnet 15 releases the mass. During the relative angular movement, the mass moves in close proximity to the switch 14. When this relative movement takes place, the switch is operated. In an electrically operated hand tool, the switch may, for instance, interupt the electrical power supply to the driving motor. After the switch has been triggered, and the mass is restored to its original position with a certain delay by the spring 13 moving into the position relative to the housing 1 as shown in FIG. 2.

While specific embodiments of the invention have been shown and described in detail to illustrate the application of the inventive principles, it will be understood that the invention may be embodied otherwise departing from such principles.

We claim:

1. A manually guided, motorized hand tool for drilling and/or percussive drilling comprising a housing, a handle attached to said housing, said housing having a drilling axis extending therethrough, a shaft located within said housing and disposed parallel to the drilling axis, means for mouting a drilling tool on the drilling axis of said housing so that the drilling tool can be rotated, a mass mounted on and rotatable relative to said shaft in a plane extending substantially perpendicular to said shaft so that said mass is rotatable relative to said housing in a plane extending substantially at right angles to the drilling axis, said mass has a moment of inertia so that when a moment of reaction about said shaft rotates said housing said mass remains stationary whereby relative movement takes place between said mass on said shaft and said housing, a switch located within and mounted on said housing and operable by said mass when said mass experiences a predetermined angular displacement relative to said housing, and said switch arranged to interrupt the power supply to said drive means when said switch is operated by said mass.

2. A manually guided, motorized hand tool, as set forth in claim 1, wherein said shaft forms an extension of the drilling axis.

3. A manually guided, motorized hand tool, as set forth in claims 1 or 2, wherein said switch is a non-contact proximity switch.

4. A manually guided, motorized hand tool, as set forth in claims 1 or 2, including a spring attached to said housing and to said mass for providing a restoring force on said mass for returning it to its original position relative to said housing after angular displacement of said mass relative to said housing, and the relative angular displacement of said mass with respect to said housing effects the operation of said switch.

5. A manually guided, motorized hand tool, as set forth in claims 1 or 2, including a holding element mounted on said housing and providing a holding force on said mass, said mass overcomes the holding force of said holding element when it moves through a predetermined angular displacement relative to said housing, and the predetermined angular displacement affords the operation of said switch.

6. A manually guided, motorized hand tool, as set forth in claim 5, wherein said housing element is a magnet.

7. A manually guided, motorized hand tool, as set forth in claims 1 or 2, wherein said mass is dumb-bell shaped.

* * * * *